Jan. 1, 1935.  W. H. FARROW  1,986,566
LIQUID METER
Filed May 20, 1931
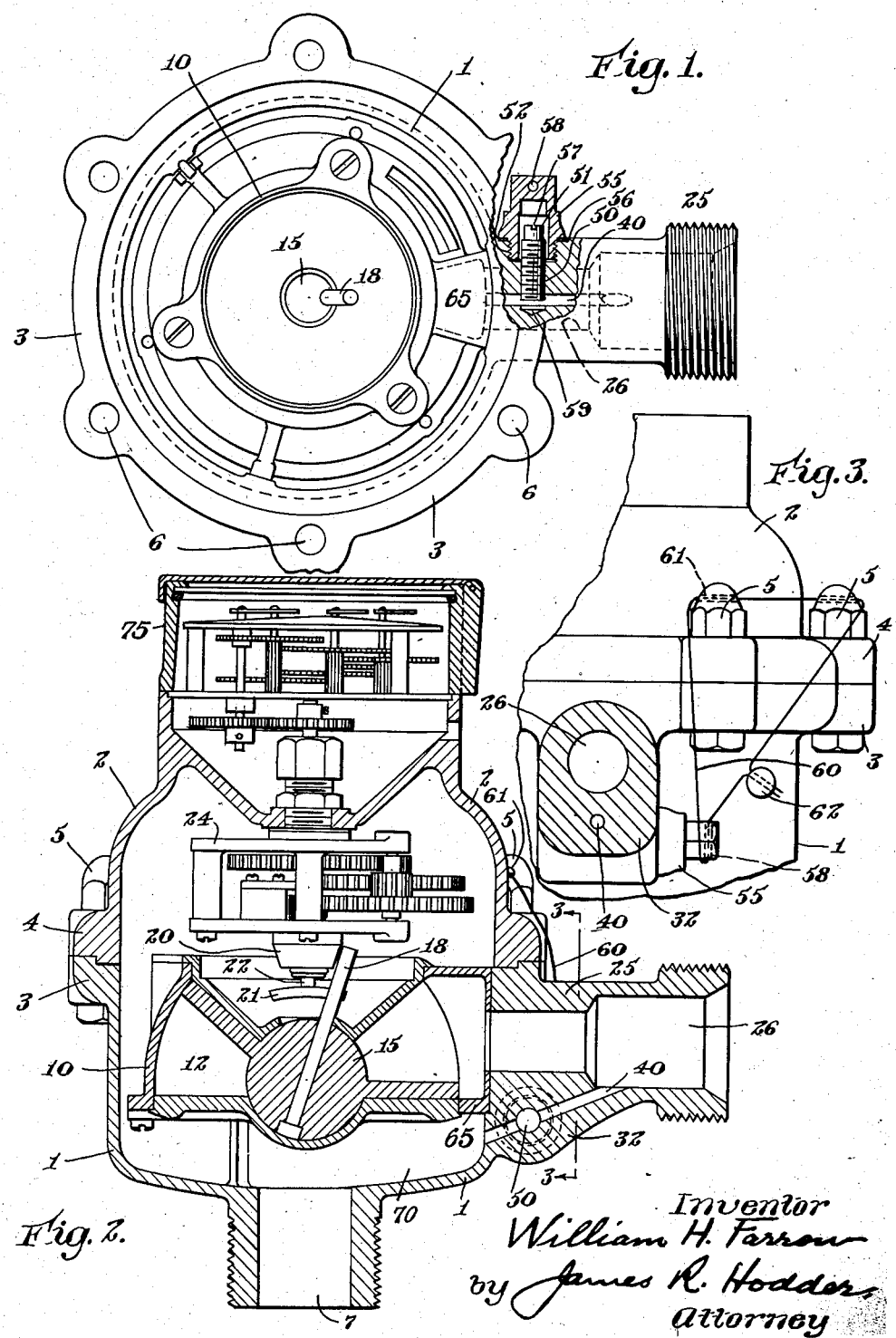

Patented Jan. 1, 1935

1,986,566

UNITED STATES PATENT OFFICE 1,986,566

LIQUID METER

William H. Farrow, Arlington, Mass., assignor to Hersey Manufacturing Company, Boston, Mass., a corporation of Massachusetts Application May 20, 1931, Serial No. 538,661

1 Claim. (Cl. 73—98)

My present invention relates to liquid meters, preferably wherein a register or indicator is utilized.

In the construction of liquid meters, particularly those used to measure and indicate quantities of gasoline, or the like, while flowing therethrough, it is important to provide means which will enable the mechanism to be accurately adjusted relatively with the flow of liquid through the meter. For this purpose, it is customary to arrange a by-pass for the flow of liquid between the inlet and outlet in the meter, and means to control the flow therethrough, so that the adjustment of the measuring devices can be effected for the liquid passing through such devices.

Heretofore, considerable difficulty has been experienced with previous by-pass structures because the capacity of the by-pass is subject to continual variation and fluctuation by reason of variations in flow and turbulence of the liquid within the apparatus. Such difficulties were accentuated by prior constructions wherein right-angled elbows, curves, double drilling of holes to form a by-pass were usually employed. My present invention obviates these difficulties and utilizes a short and direct by-pass with a single boring or coring, and from a convenient position in the outlet, thus eliminating cross-borings, plugging of bored passages, etc.

Furthermore, the adjusting screw, or like means, to vary the flow in the by-pass has been difficult to fit in inconvenient positions and, usually, prior devices would have the by-pass opening from some interior part of the mechanism where disturbance, turbulence, and such varying factors were objectionable.

Even though the by-pass may be adjusted accurately for a normal or usual rate of flow, yet increased or decreased rate will distort the effect and vary the accuracy of the mechanism.

My present invention aims to obviate the difficulties above noted and to provide an improved meter structure, wherein an improved and direct straight lined by-pass is conveniently, easily, and efficiently arranged, leading from a position where disturbing variations in flow and pressure will be minimized or eliminated, and directly into the outlet, and also in a more compact, less expensive, and easily manufactured construction.

An important feature of the present improved meter consists in the arrangement, position, construction, and action of my novel arrangement of by-pass and means for controlling and adjusting the flow therethrough, the by-pass consisting in a short, straight, bored or cored passage from the outlet inwardly to a location substantially free of disturbance, a turbulence, and pressure variations, and the straight, direct, bored passage eliminates curves, elbows, and the like former structures. While the provision of a by-pass in similar devices has long been employed, great difficulty has been experienced in prior arrangements of a by-pass because of the variable flow therethrough. My discovery of arranging and positioning the by-pass with the advantages of a relatively short, direct, and straight line between the outlet and a point within the casing where the least turbulence, disturbance, and pressure variations are found to exist results in a more uniform, steady, and even flow through the by-pass and, hence, a great improvement in the operation of the meter.

A further feature consists in my improved construction wherein a single bored hole intercepting the by-pass carries the adjusting screw, a seat cover therefor, and suitable provision for sealing both the by-pass adjustment and the entire apparatus.

Furthermore, a straight by-pass has a greater capacity for a given size of hole than one having bends, angles, etc. Therefore, a smaller hole can be used for any desired capacity, which tends to decrease turbulence and other disturbances of liquid flow. It is, therefore, an important feature of my present invention to provide a straight, direct, and relatively short by-pass free of bends, irregularities, variable ports, or other constructions which would cause, or tend to cause, variations in pressure between the interior of the casing and the outlet. My improved construction carrying out this feature, in addition to the important fact of leading such a by-pass directly from a pocket or joint, free of turbulence or the like disturbance within the casing, constitutes a valuable and important novel combination.

I have discovered that the by-pass, if located at the point of least disturbance in the liquid current flow and in a convenient position, permitting ready adjustment of the capacity of the by-pass, will largely eliminate the difficulties heretofore experienced and insure more accurate and permanent adjustment of the indicating or registering devices than has heretofore been possible.

Further important advantages, features, and novel combination of parts will be hereinafter more fully pointed out and claimed.

Referring to the drawing illustrating a preferred embodiment of my present invention, Fig. 1 is a plan view of the base with a by-pass controlling means shown in cross-section;

Fig. 2 is a vertical cross-sectional view, and

Fig. 3 is a fragmentary view, partly in cross-section on the line 3—3 of Fig. 2.

As shown in the drawing, my present invention is associated with a standard type of well known Hersey disc meter, particularly for measuring small quantities of gasoline, but is not confined to meters of this class. The meter includes a bottom case 1 and top case 2 arranged to connect with and operate any usual indicating device, provided respectively with cooperating and interlocking flanges 3 and 4, united at a plurality of points by suitably threaded bolts and nuts 5 passing through recesses 6, 6, and enlargements in the flange at registering points therefor. The bottom case 1 has an inlet 7 permitting flow of liquid into a receiving chamber 8, which liquid, in turn, flows into the measuring chamber of usual construction, having the enclosing casing 10, interior 12, and the piston 15. A driving spindle 18 bearing on the cone 20 imparts rotary motion to the pawl or pin 21 and the spindle 22, which, in turn, actuates the gear train or pinions and gears held in the frame 24 and turns the indicators indicated diagrammatically at 75. The bottom case 1 also carries a side casing 25 through which the outlet 26 is formed. Liquid flowing through the inlet 7 into the receiving chamber 8 thence fills the apparatus and flows through the measuring chamber 12, effecting the action of the piston, and thence outwardly through the outlet port 26.

It will be appreciated that the inlet 7 may be positioned at any convenient point, being here shown as at the bottom portion as the preferred position. As shown, the outlet 26 is positioned at the side substantially as shown, and the bottom case 1 is formed with a slight enlargement 32, through which I have located my improved by-pass 40.

This by-pass is a short and straight opening from the receiving chamber 8 in the bottom case to the outlet 26, also in the bottom case. In my preferred form, and as shown in the drawing, the liquid flow entering the inlet 7 rises between the inner walls of the casing and the exterior of the measuring chamber 10 except only under the outlet portion 65 of the measuring chamber. This construction provides a "pocket" 70 under the outlet portion where there is no substantial current upwardly and around the measuring chamber and, hence, where there is provided a point of least or no turbulence, disturbance, or distorting pressures in the liquid, and it is to this pocket that I lead the by-pass in a straight line directly to the outlet 26. Crossing the by-pass 40 I provide a recess 50, having same appropriately tapped to receive the adjusting screw 51. Preferably also, the recess 50 is counterbored at its topmost portion, as shown at 52, Fig. 1, and is threaded to receive the corresponding threaded shank of a covering cap 55. The adjusting screw 51 is of appropriate diameter to completely close the by-pass 40, if desired, and preferably I arrange a seat 59 for the lowermost portion of the adjusting screw 51 in case it is desired to completely close the by-pass. A gasket or washer 56 is fitted, as shown in Fig. 1, to give a liquid-tight seal when the cap 55 is threaded in position. Removal of the cap 55 permits ready access to the adjusting screw 51, which may be provided with a slot 57 to receive a screwdriver to effect the adjustment desired, threading the adjusting screw appropriately into the by-pass 40 to effect adjustment of the flow with regard to the dial indications. After this adjustment is effected, the cap is then applied and, preferably, a bored recess 58 in the head of the cap 55 is provided, through which a sealing wire 60 may be threaded and through a corresponding recess 61 in the adjacent nuts 5, 5 holding the cap and base together, so that both the by-pass adjustment and the entire apparatus is simultaneously sealed, the ends of the wire thus threaded being engaged by the usual plastic seal 62.

I find that by thus positioning the by-pass 40 from the liquid receiving chamber of the bottom case 1, and apart from the turbulence caused by the liquid flow around the interior of the cap and measuring chamber 12, the by-pass is rendered free of variations from such a source of disturbance. In the interior of the measuring chamber 12, however, and the upper part of the meter, there is apt to be more or less turbulence, as above noted, and hence a by-pass from the upper part of the meter outwardly is subjected to the objections above noted. My arrangement, whereby the by-pass is located at the point of least disturbance within the meter structure and at points free of turbulence and other disturbing factors, constitutes most important features and enables the adjustments in a by-pass to be fixed and determined with more permanent corrective results on the indicating dials than has heretofore been possible.

I claim:

A liquid meter of the kind described, comprising a top casing, a bottom casing, means uniting both top and bottom casings in liquid-tight relationship, a measuring chamber contained within said united casings and positioned above the bottom wall of the bottom casing, a nutating liquid measuring disc within said chamber, an inlet into said casing and an outlet therefrom, a bypass beginning at a point of least turbulence under the metering chamber adjacent said outlet, said bypass being short, straight, and diagonally disposed with reference to both the inlet to and outlet from the casing to a point beyond the outlet opening.

WILLIAM H. FARROW.